Dec. 12, 1933.  R. D. BAKER  1,939,289
MACHINE FOR FINE GRADING ROADBEDS
Filed Oct. 15, 1930  12 Sheets-Sheet 1
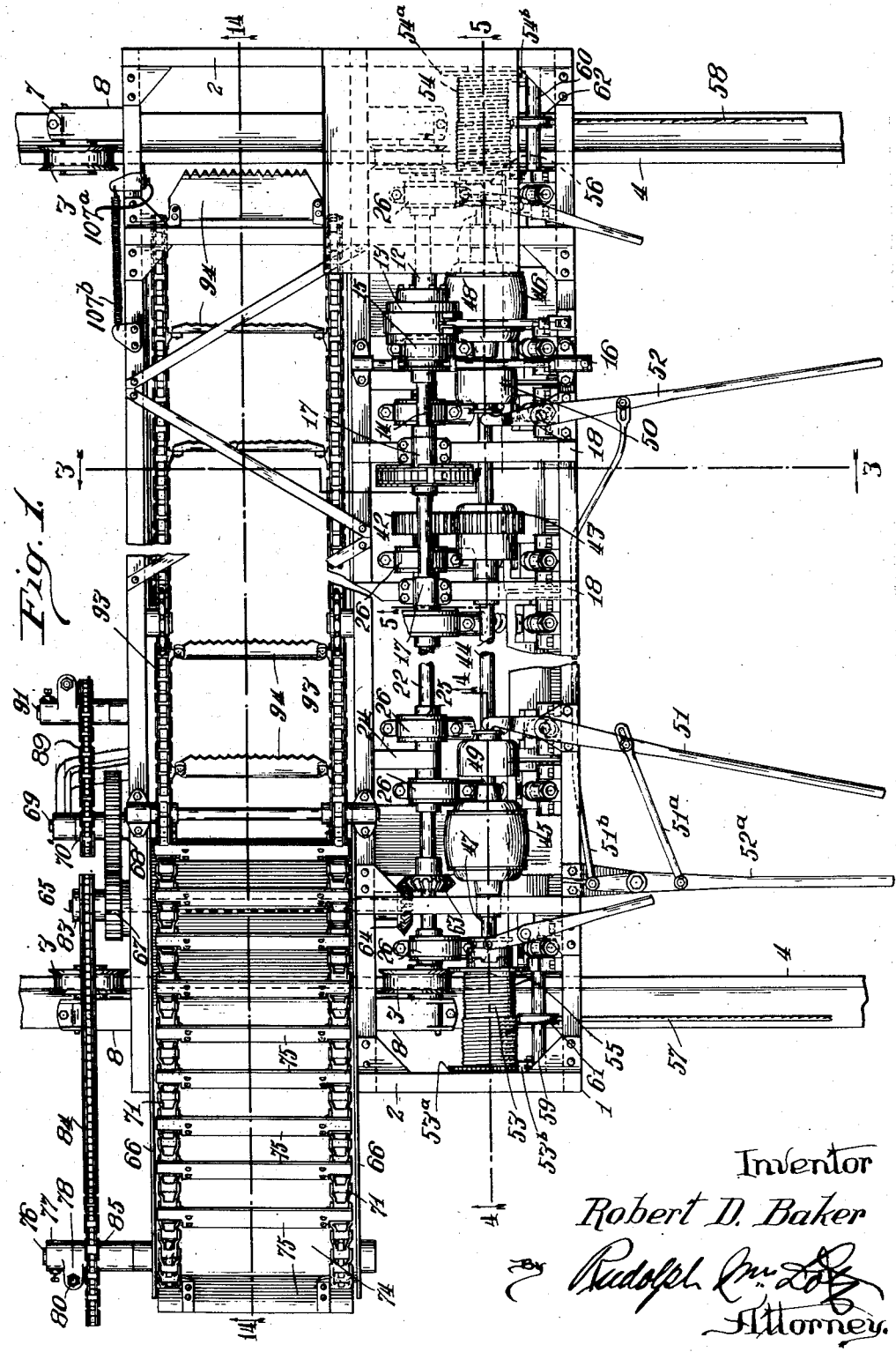
Inventor
Robert D. Baker
By Rudolph [...]
Attorney.

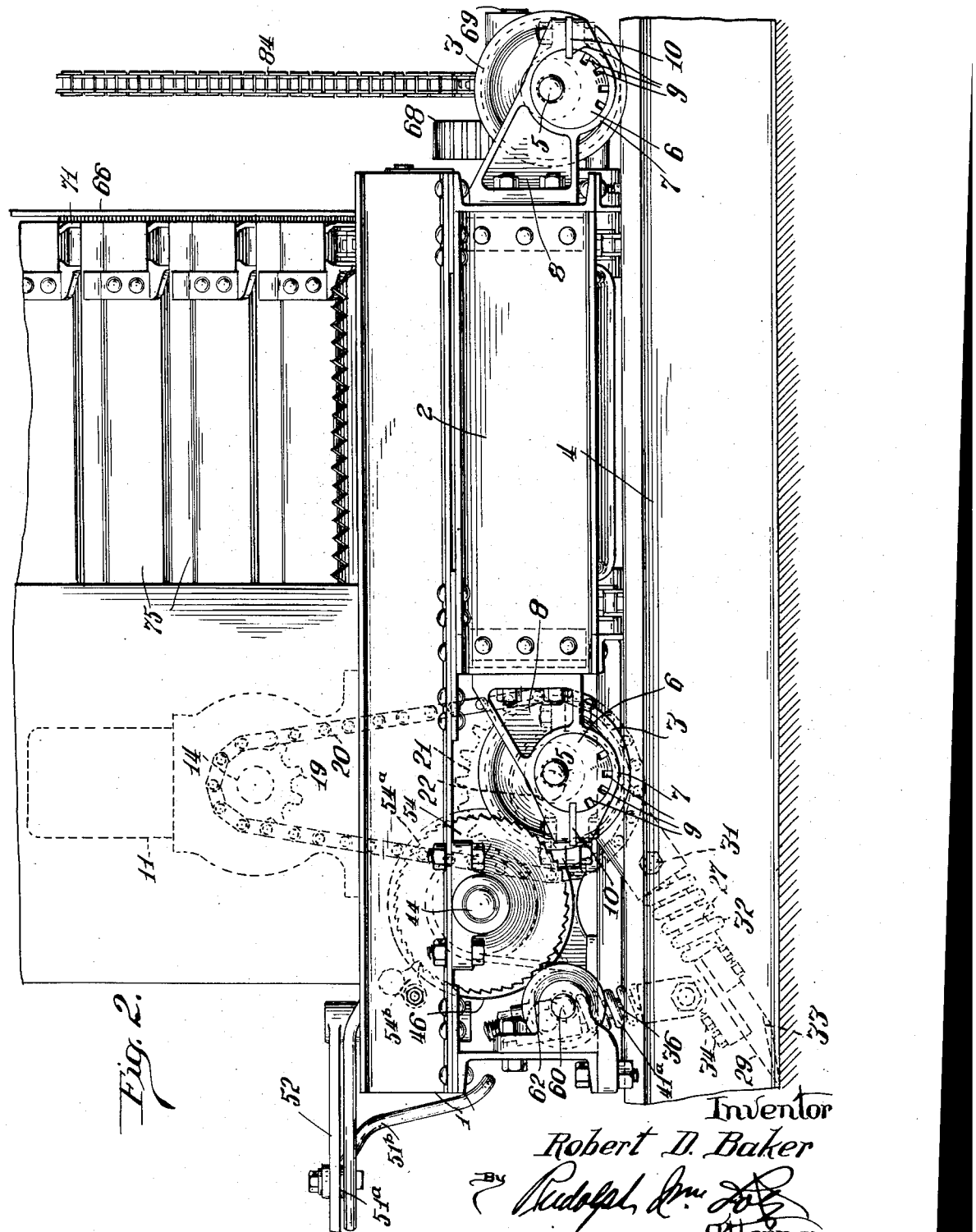

Dec. 12, 1933.  R. D. BAKER  1,939,289
MACHINE FOR FINE GRADING ROADBEDS
Filed Oct. 15, 1930  12 Sheets-Sheet 3
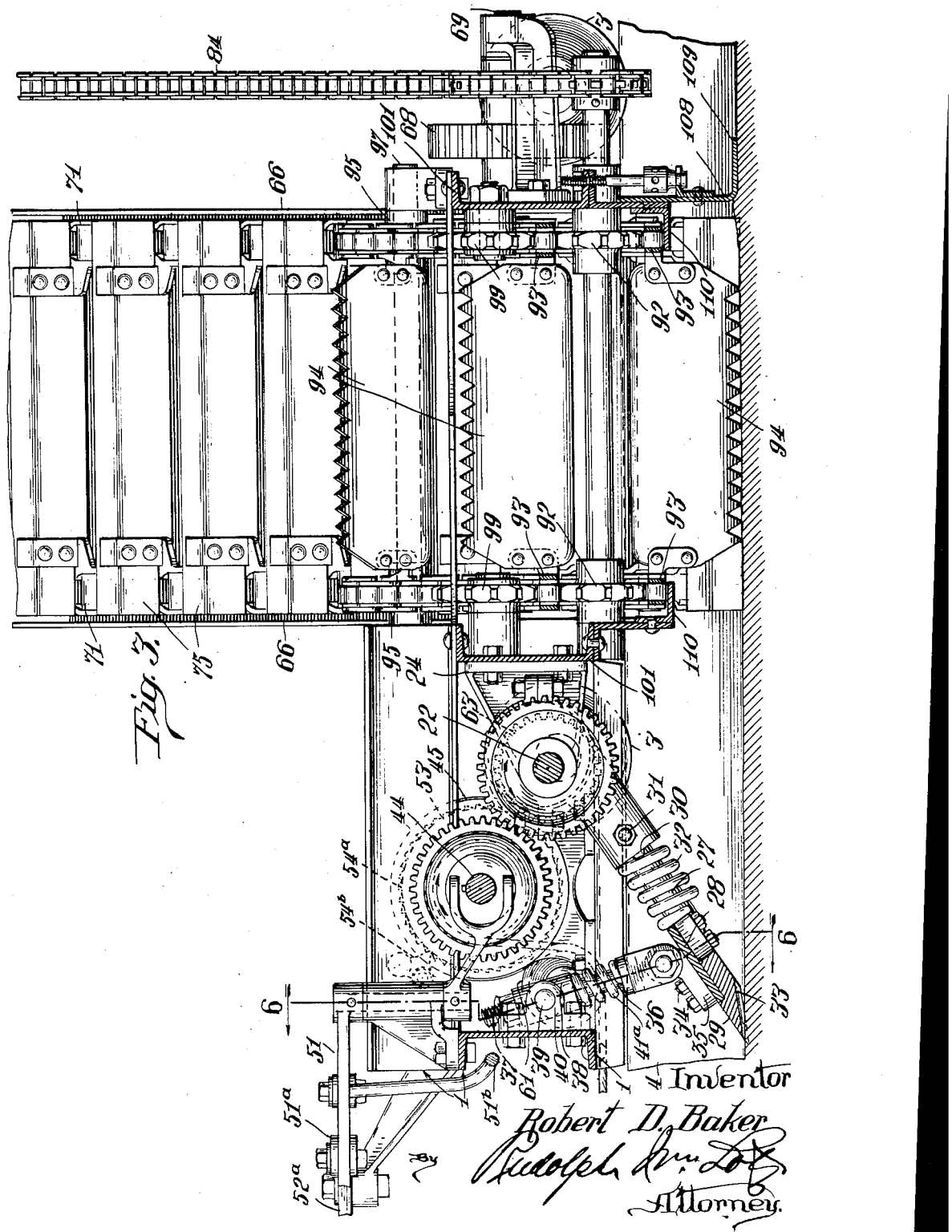

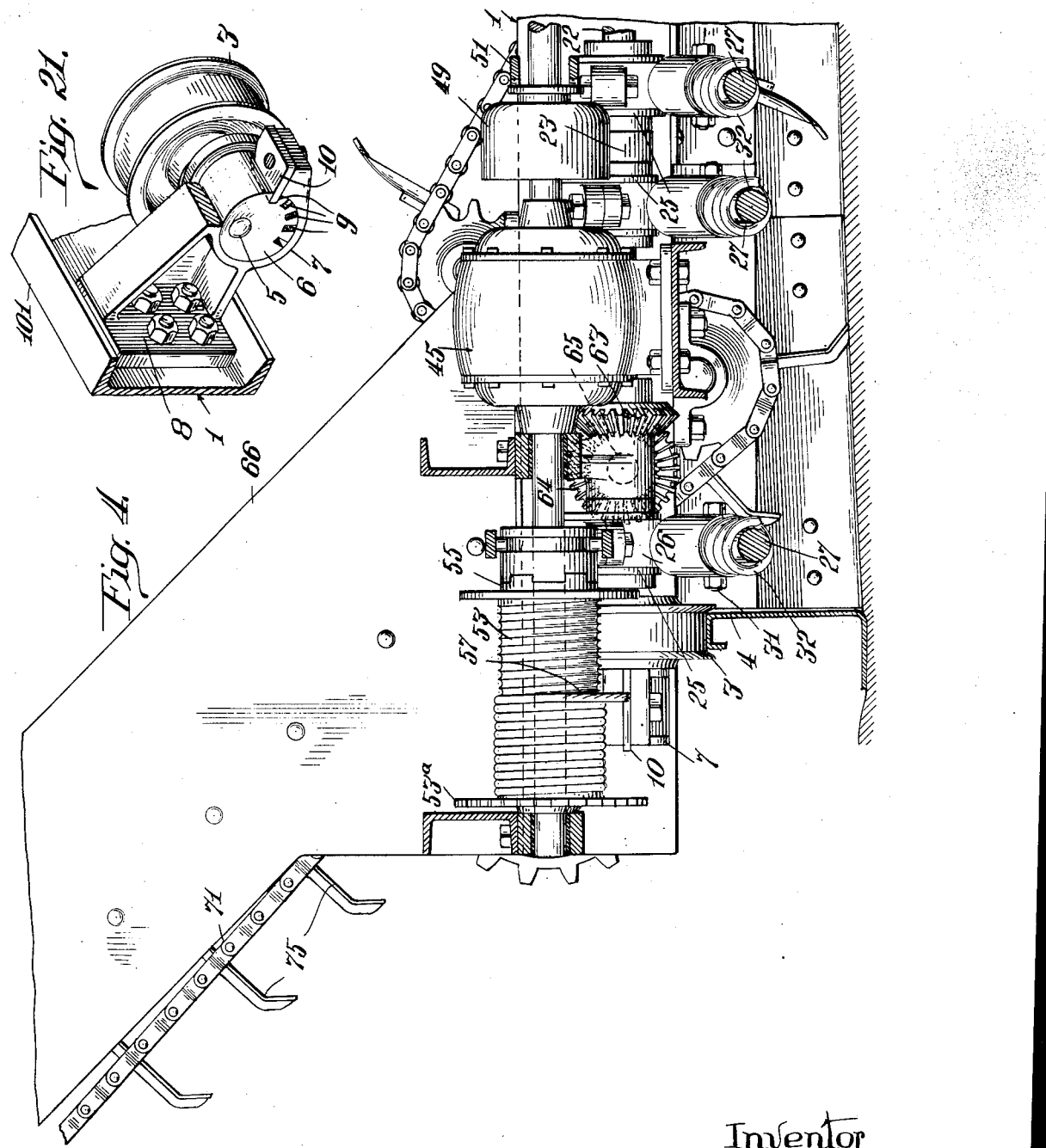

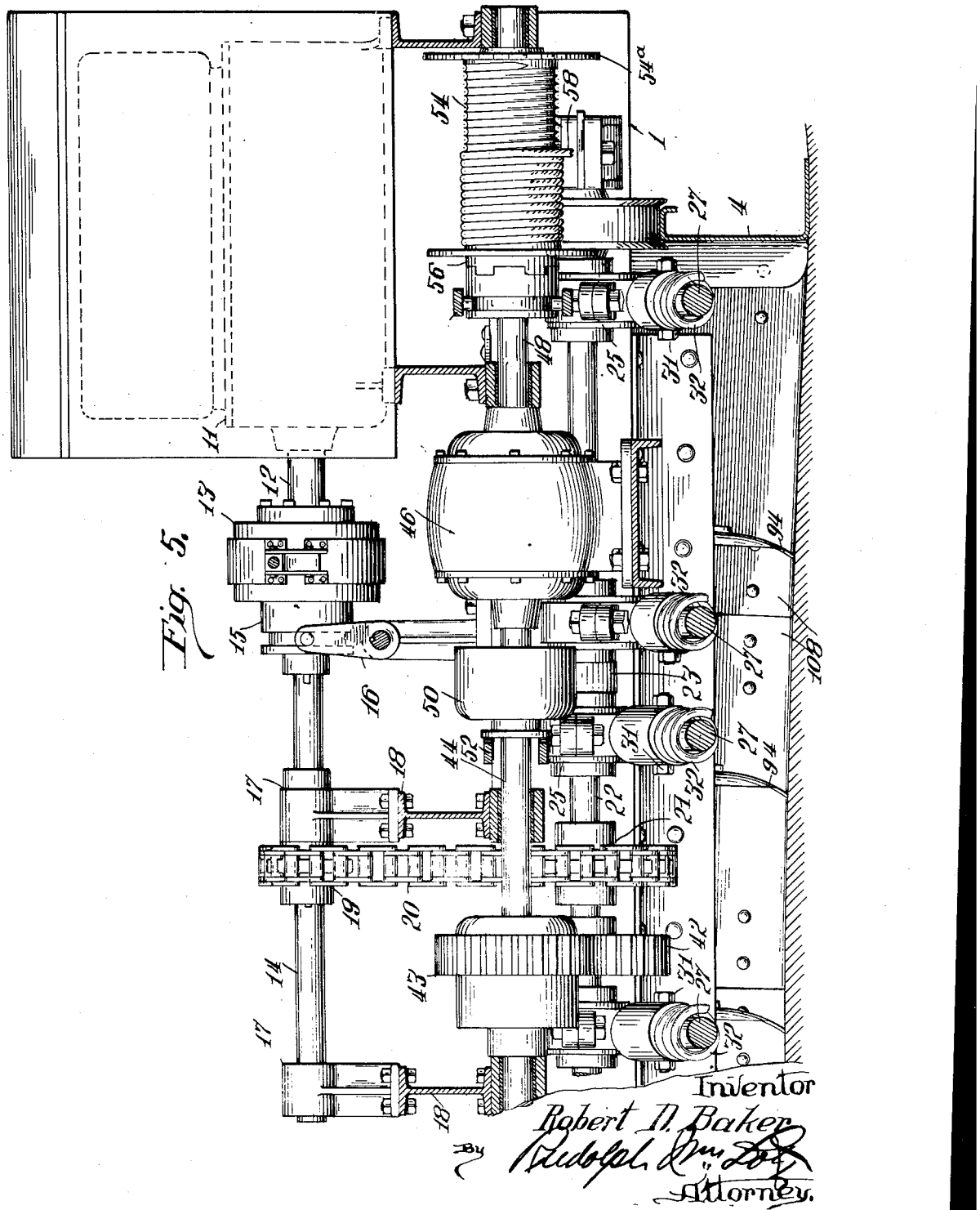

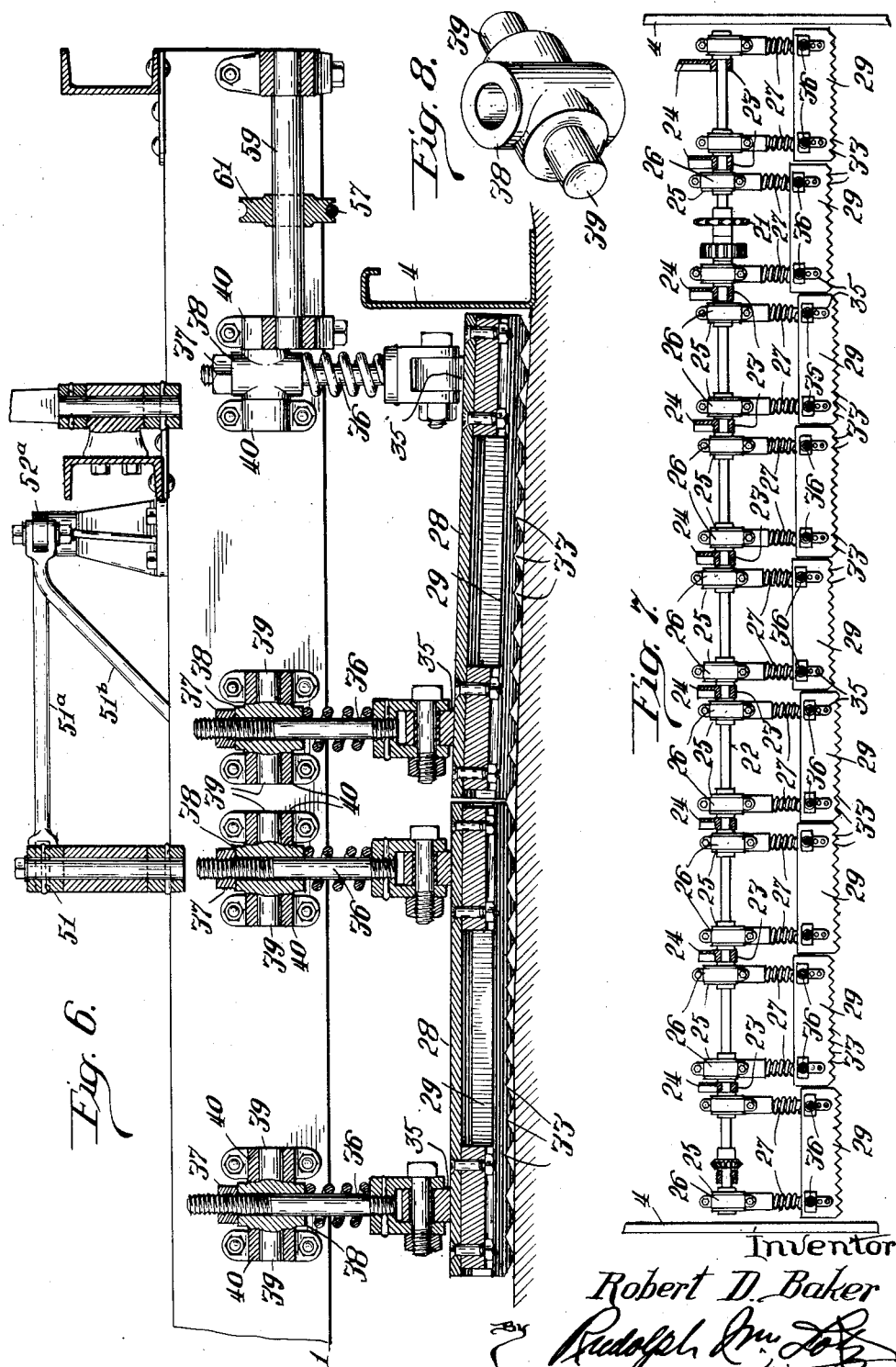

Dec. 12, 1933.            R. D. BAKER            1,939,289
                MACHINE FOR FINE GRADING ROADBEDS
              Filed Oct. 15, 1930      12 Sheets-Sheet 7
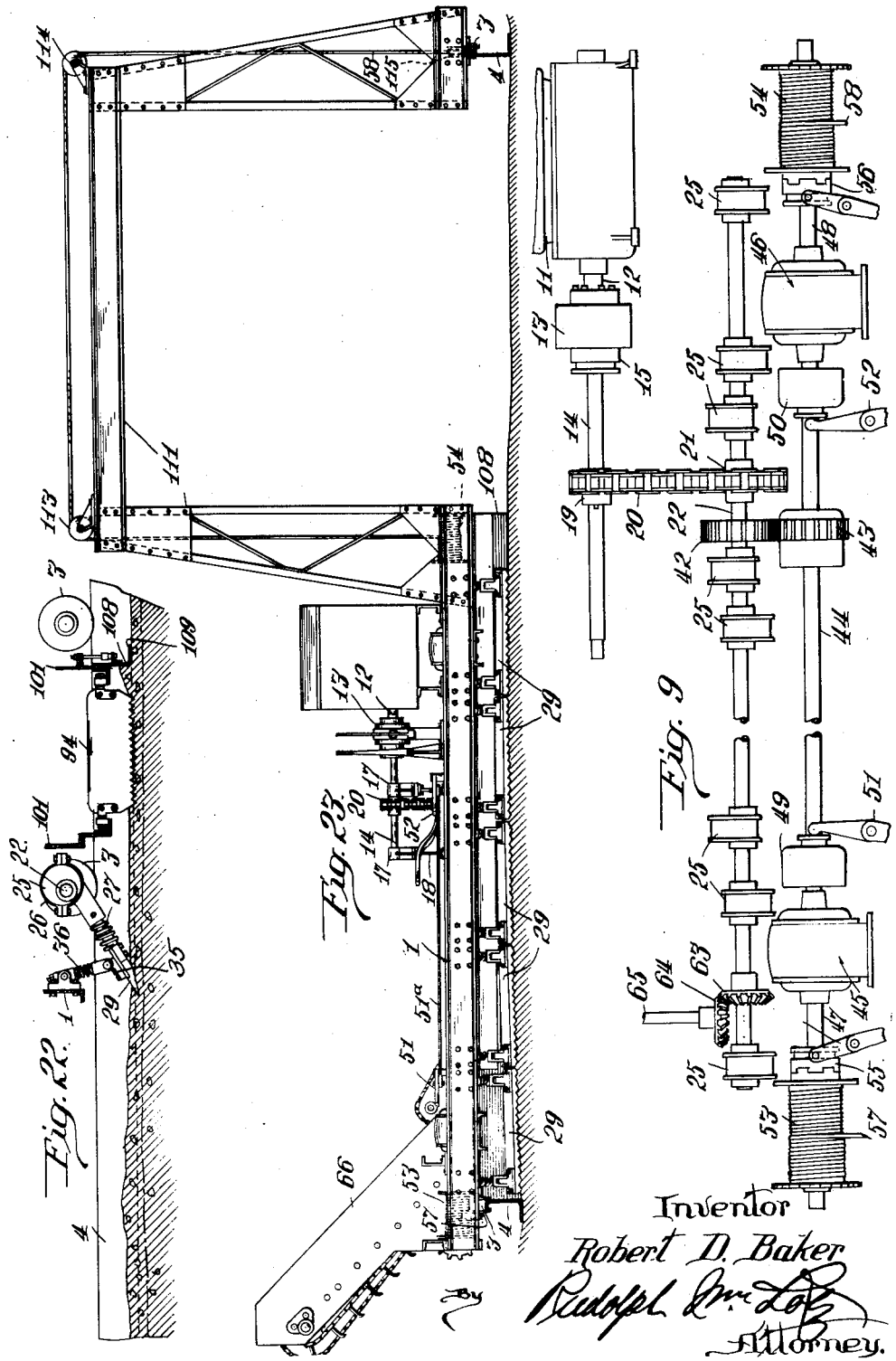
Inventor
Robert D. Baker
By Rudolph Wm Lotz
Attorney.

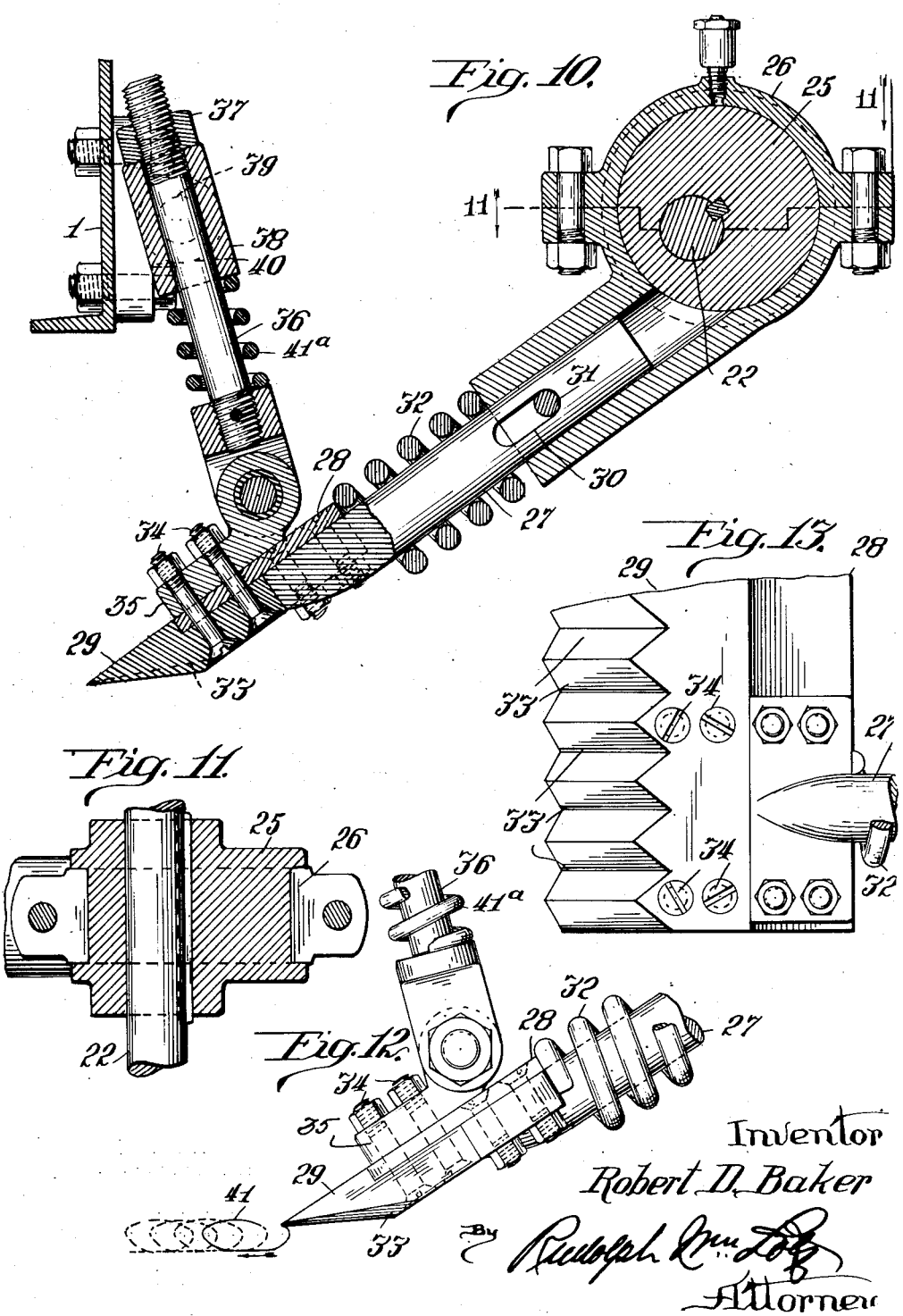

Dec. 12, 1933.  R. D. BAKER  1,939,289
MACHINE FOR FINE GRADING ROADBEDS
Filed Oct. 15, 1930  12 Sheets-Sheet 9
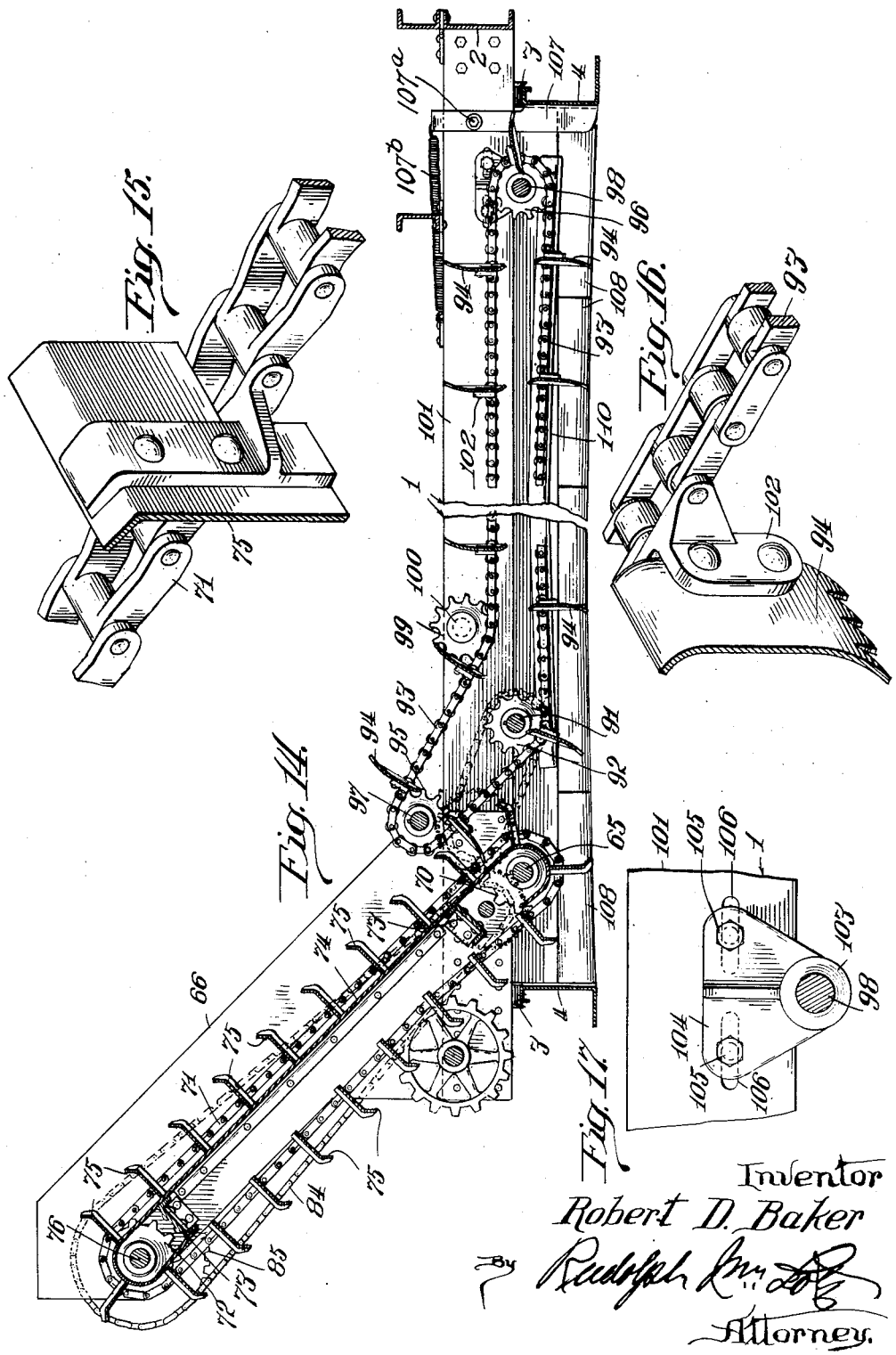
Inventor
Robert D. Baker
By Rudolph [...]
Attorney.

Dec. 12, 1933.         R. D. BAKER         1,939,289
MACHINE FOR FINE GRADING ROADBEDS
Filed Oct. 15, 1930         12 Sheets-Sheet 10
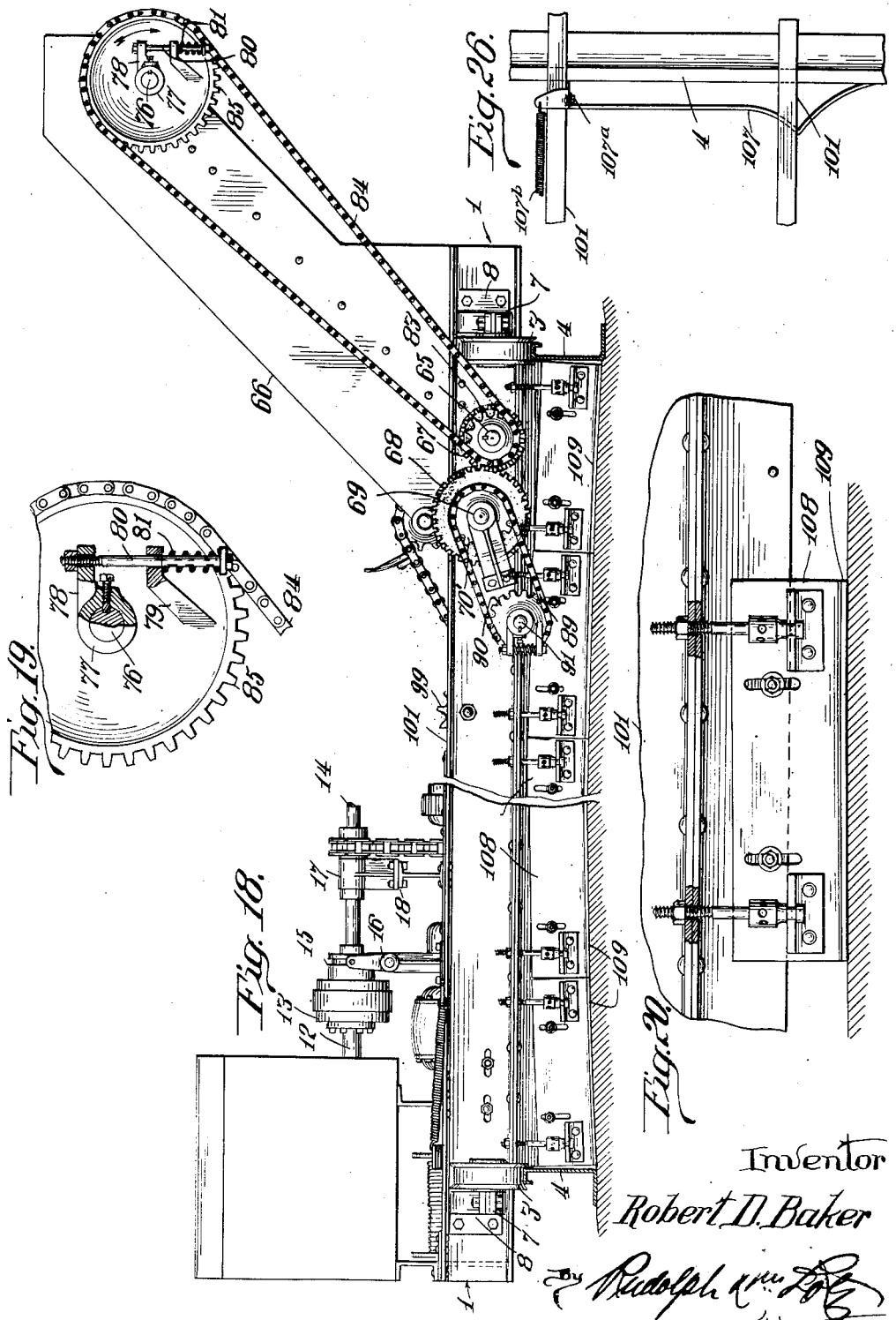
Inventor
Robert D. Baker
By Rudolph Wm Lotz
Attorney.

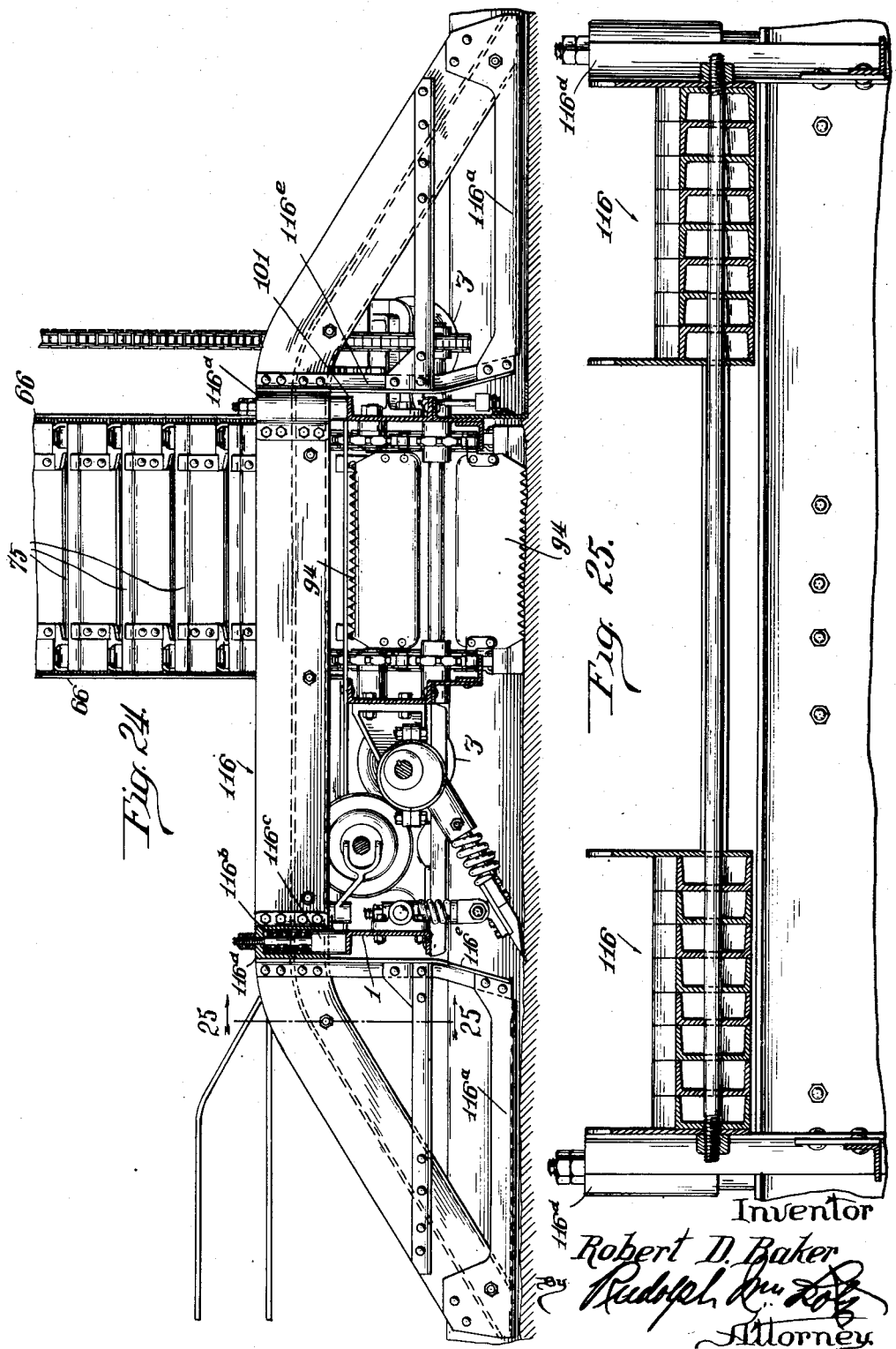

Dec. 12, 1933.  R. D. BAKER  1,939,289
MACHINE FOR FINE GRADING ROADBEDS
Filed Oct. 15, 1930   12 Sheets-Sheet 12

Inventor
Robert D. Baker
Attorney.

Patented Dec. 12, 1933

1,939,289

UNITED STATES PATENT OFFICE 1,939,289

MACHINE FOR FINE GRADING ROADBEDS

Robert D. Baker, Royal Oak, Mich.

Application October 15, 1930. Serial No. 488,734

34 Claims. (Cl. 37—108)

This invention relates to improvements in machines of the type known as "fine-grading machines" used in highway construction to produce a uniform surface of predetermined cross-sectional contour or "crown" upon which the paving material such as concrete is spread.

The invention further relates to a novel method of producing an accurate fine-grade of substantially uniform density or compactness free from stones, boulders and the like.

With respect to the machine of this invention, the main object is to provide a mechanism which is very efficient and also sufficiently light to permit the same to be readily handled for temporary removal from the side forms bordering the fine-grade area and supporting the machine to permit the passage of supply trucks to the mixer and for transportation of the machine from one location to another, and, further, to provide a machine of this character which can be sold to road-construction or paving contractors at a very moderate price.

Consistently with the foregoing objects of the invention as expressed in terms of mechanism, the invention resides in the details of the gearing and arrangement of clutches associating the engine with the various component mechanisms of the machine to reduce the total weight of said gearing and clutches to the minimum consistent with the strains and stresses to which the same are subjected.

Other objects of the invention as expressed in terms of mechanism will be pointed out in the following description.

The main object of the invention expressed in terms of the method aforesaid is to so manipulate the earth as to provide a fine-grade of substantially uniform density or compactness throughout the entire area thereof, said method being capable of being carried out by manual labor with the aid of ordinary tools and appliances as well as in part by the machine of this invention.

The preferred embodiment of the invention insofar as it relates to the said machine is fully illustrated in the accompanying drawings, wherein:—

Fig. 1 is a top plan view of a machine constructed in accordance with the invention.

Fig. 2 is a side elevation of the same.

Fig. 3 is a vertical sectional view on the line 3—3 of Fig. 1.

Fig. 4 is a vertical sectional view on the line 4—4 of Fig. 1.

Fig. 5 is a vertical sectional view on the line 5—5 of Fig. 1.

Fig. 6 is a substantially vertical sectional view on the line 6—6 of Fig. 3.

Fig. 7 is a diagrammatic plan view of the shovel blades and actuating mechanism therefor.

Fig. 8 is a perspective view of a trunnioned sleeve of the shovel blade actuating and adjusting mechanism.

Fig. 9 is a diagrammatic illustration of the gearing and clutch controls therefor, associating the engine shaft with the several operating mechanisms of the machine.

Fig. 10 is an enlarged detail vertical sectional view illustrating the shovel blade actuating and adjusting means.

Fig. 11 is a plan section on the line 11—11 of Fig. 10.

Fig. 12 is a fragmentary detail side elevation of one of the shovel blades and includes a diagrammatic illustration of the movement of the shovel blade edge during travel of the machine.

Fig. 13 is a fragmentary inverted plan view of a shovel blade and its carrier.

Fig. 14 is a vertical sectional view on the line 14—14 of Fig. 1.

Fig. 15 is a fragmentary detail perspective view, partly in section, showing a conveyor blade of the earth elevator at the left hand side of Fig. 14 and a portion of one of the sprocket chains of the latter.

Fig. 16 is a view similar to Fig. 15, showing one of the wiper blades of the earth conveyor which feeds the elevator.

Fig. 17 is an enlarged detail view of a bracket supporting a bearing for one of the conveyor shafts.

Fig. 18 is a rear elevation of the machine.

Fig. 19 is a fragmentary detail vertical sectional view showing a cushioning or shock absorbing means associated with the earth elevating mechanism.

Fig. 20 is a fragmentary detail vertical sectional view showing mechanism for adjusting the earth compacting devices at the rear end of the machine.

Fig. 21 is a detail perspective view, partly in section, showing the means employed for elevation of the entire machine carriage relatively to the side forms on which the same travels.

Fig. 22 is a diagrammatic view illustrating the novel method of producing an accurate fine-grade constituting a part of the invention.

Fig. 23 is a diagrammatic front elevation of the machine of Figs. 1 to 21, inclusive in a modified form for use in very wide highway construction.

Fig. 24 is a vertical sectional view of the machine equipped with a bridge-structure for permitting material trucks to pass over the same.

Fig. 25 is a sectional view of the same on the line 25—25 of Fig. 24.

Fig. 26 is a diagrammatic fragmentary detail plan view showing earth deflecting means employed.

Figure 27:
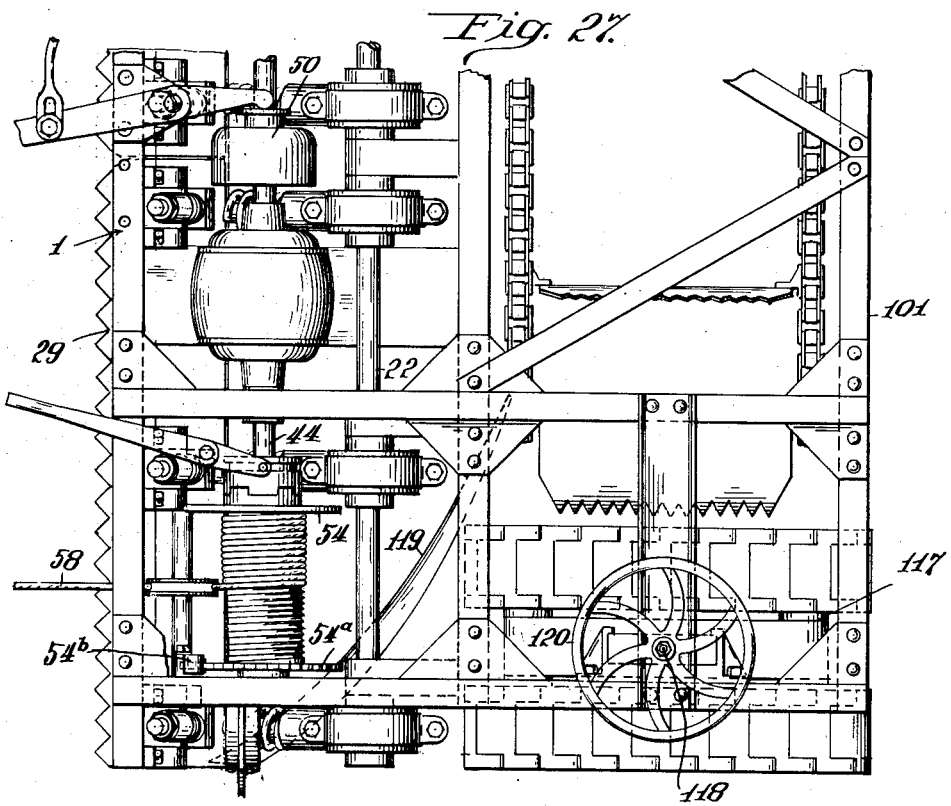
Fig. 27 is a fragmentary top plan view of the machine showing a modification in construction to adapt the same for fine-grading one side portion of a pavement strip of greater width than the machine.

The present invention may be considered as presenting certain improvements over the structures and methods disclosed in Letters Patent Nos. 1,653,333, dated December 20, 1927 and 1,768,657, dated July 1, 1930, to improve the operation of said machines and, as to that of the last-mentioned Letters Patent in particular, to reduce considerably the weight of the machine while increasing its efficiency and greatly reducing the cost of construction and operation of the same.

In the construction of paved highways, the cost of producing an accurate fine-grade between the side forms is regarded as the most expensive step in such construction from the standpoint of labor cost and of waste of material so that an improvement in the method of producing such a fine-grade and the provision of such a machine adapted to efficiently carry out said method in part and thus eliminate a large part of the labor cost incident thereto as well as to eliminate waste of paving material and cost of relaying sections of highway paving due to inaccurate fine-grade, is greatly desired by those engaged in the paved highway construction art.

Highways are constructed almost entirely by contractors whose investment in equipment best adapted to reduce labor cost is very high, and whose business is quite hazardous by reason of the various unknown quantities, such as adverse weather conditions and unknown and unexpected conditions of the earth along the highway to be constructed, which frequently are encountered. Hence, these contractors are obliged to reduce investments in equipment to the lowest point consistent with economic operations and require that all equipment be of such a nature as to be easily handled at the job and also be easily transported from one location to another.

The machines used by these contractors are, furthermore, exposed to all manner and kind of weather and to considerable abuse, sometimes due to unexpected earth conditions but largely due to inexperienced and injudicious use.

To meet the various requirements above pointed out, the machine must be as cheap as possible consistently with necessary strength and durability; must also be as light as possible to facilitate handling and transportation thereof which is also a factor in low cost of the machine; and, furthermore, must present the lowest possible number of operating elements including gear elements and, as to the latter, the least possible number of exposed parts because of ever-present dust tending to wear and clog the gear wheels and shaft bearings and thus cause breakages and distortions of wheels and shafts, etc.

The present invention is, therefore, designed and directed to the provision of a method of producing accurate and uniformly compact fine-grades and a machine which, in connection with the practice of said method, presents all of the above-mentioned desirable characteristics.

In this connection I desire to state that the machine of said Letters Patent No. 1,768,657 has been very successfully used in various parts of the United States but, because of its great weight, large number of operating parts, etc., is far too expensive for the average contractor, subject to too many repairs and, in localities where the earth is very soft as in marshy or very sandy soil, sinks the side forms on which it travels. Aside from these factors, it is exceedingly accurate and efficient in operation in areas presenting very hard soil or soil full of coarse gravel and boulders as it easily cuts the hard soil and removes or cuts through rocks and the like encountered in travel unless the rocks are very large and hard. An appreciably large number of said machines have been built and sold and are being used at this time in localities where the character of the soil enables them to be economically operated.

The machine of the present invention operates somewhat differently from those of the said respective Letters Patent and more advantageously as will be understood readily from the following description.

The present machine comprises a suitable frame preferably composed of structural steel elements such as channel-bars, I-beams, angle-irons and the like, relatively arranged and associated to accommodate the various operating parts and resist the strains and stresses to which the whole structure is subjected. The machine frame illustrated in the accompanying drawings may be considered more or less diagrammatic and subject to such changes as engineering skill and experience in practice may dictate. The said frame work 1 is carried by side frame members 2 supported upon flanged car wheels 3 adapted to travel on the side forms 4 bordering the area to be fine-graded. The wheels 3 of the frame member 2 at one side of the machine are independent of the wheels of the other side frame member 2 for reasons hereinafter pointed out. The trunnions 5 of the wheels 3 are journalled in eccentrics 6 (Figs. 2 and 21) which in turn, are journalled in bearings 7 in brackets 8 at the ends of the frame members 2. Each eccentric is provided with a series of peripheral recesses 9 in which keys 10 engage for preventing rotation thereof. The position of said eccentrics 6 is adjusted to vary the elevation of the plane of operation of the shovel blades of the machine by first elevating the frame 1 by means of jacks, then removing the keys 10, rotating the eccentrics to the desired position, replacing the keys 10 and thereupon lowering the frame 1. Such adjustments are so infrequently required as to render this means of effecting the same entirely satisfactory. The latitude of such adjustment approximates a maximum of ten inches for reasons hereinafter pointed out.

Mounted upon the frame 1 at one side of the machine is the engine 11, the shaft 12 of which has a speed, for example, of 750 R. P. M. This shaft constitutes the high-speed shaft of a conventional type of planetary or other type speed reducer, the casing 13 of which is suitably rigidly mounted on said frame 1. The ratio of speed reduction in the instant case from the shaft 12 to the main shaft 14 of the machine may be taken to be approximately as 750 is to 300, or two and one-half to one. Said main shaft 14 comprises two independently rotatable axially aligned parts adapted to be associated with and disassociated from each other by means of a suitable clutch 15 manually controlled by means of the hand lever 16. The outer end portion of the shaft 14 is journalled in bearings 17 of standards 18 and carries a sprocket wheel or pinion 19 geared by means of the sprocket chain 20 to the sprocket wheel 21 of the countershaft 22 (see Figs. 5 and 9).

The countershaft 22 extends over the entire width of the frame 1 and is journalled at and between its ends in suitable bearings 23 carried by brackets 24 mounted on a frame member. This shaft is also clearly shown in Fig. 7 and carries a plurality of pairs of eccentrics 25 variously disposed thereon so that each pair or each group of more than a pair thereof will attain a given position in given relation to another pair or group thereof. The ratio of speeds between shafts 14 and 22 is approximately as 300 is to 125 or twelve to five.

It will be noted that in Fig. 9 the position of shaft 22 is shown as different than its position in Figs. 2, 3, and 5. In the latter the true position of said shaft 22 is shown, said Fig. 9 being purely diagrammatic for purposes of clearer understanding.

Each pair of eccentrics 25 imparts reciprocatory movement to a pair of sleeves 26 (see Fig. 10) which telescopically receive the inner end portions of pairs of plungers 27 secured at their other ends to plates 28 which carry shovel blades 29. Each plunger 27 is provided with a longitudinal slot 30 through which a pin 31 of its sleeve 26 passes. Helical compression springs 32 surround the plungers 27 and engage the sleeves 26 and plates 28 and shovel blades 29 for maintaining the latter normally disposed at the forward limits of their movement relatively to the sleeves 26, said springs constituting shock absorbers.

The shovel blades 29 are provided with serrated cutting edges resulting from cutting V-shaped grooves 33 in their lower beveled edges.

Bolts 34 secure the shovel blades 29 and bearing brackets or shoes 35 to the plates 28, said shoes 35 being pivotally connected with the lower ends of suspension rods 36 which are provided with threaded upper end portions to receive nuts 37, said upper end portions passing through sleeves 38 equipped with trunnions 39 whose axes are perpendicular to those of the rods 36 and are journalled in bearings 40 carried by a frame member. The rods 36 are rocked as the shovel blades 29 are reciprocated and cooperate with the eccentrics 25 to impart to the cutting edges of the shovel blades 29 a substantially rotary movement, which, by reason of forward travel of the machine during such rotary movement, elongates the latter to substantially a species of consecutive loop movement such as is diagrammatically illustrated at 41 in Fig. 12.

A compression spring 41a is interposed between the lower end of each sleeve 38 and the pivot head of each of the rods 36 and serves to maintain the latter and the shovel blade associated therewith at the lower limit of its movement, said springs 41a also acting as shock absorbers.

Intermeshing spur-gear wheels 42 and 43 associate the shaft 22 with a parallel shaft 44 which rotates at substantially the same speed as said shaft 22 and is suitably geared by means of encased planetary reducing gears in the boxes or casings 45 and 46 with countershafts 47 and 48. Suitable friction clutches 49 and 50 are interposed between the shaft 44 and the respective shafts 47 and 48, said clutches being controlled by means of hand levers 51 and 52, respectively.

The clutches 49 and 50 are of the spring-held type which are normally held thrown in, the levers 51 and 52 thereof being adapted to be operated solely to throw out said clutches, this being done as to only one of said clutches at a time in order to rectify the travel of one side of the machine with respect to the other, except when it is desired to interrupt travel of the machine. The levers 51 and 52 controlling the throw out of said clutches are both associated with a hand lever 52a by means of the links 51a and 51b, respectively, so that the operator may throw the lever 51 toward the lever 52 to throw out the clutch 49; may throw the lever 52 toward the lever 51 to throw out the clutch 50; and may throw the lever 52a toward the lever 51 to simultaneously throw out both clutches 49 and 50 to interrupt travel of the machine.

The respective shafts 47 and 48 are adapted to drive the cable wind-up drums 53 and 54, respectively, and are associated with the latter by means of the toothed clutches 55 and 56, respectively, which are operated to disassociate the said shafts from the said drums after the clutches 49 and 50 disassociate the said shafts from the shaft 44 in order to slacken the cables 57 and 58 when it is desired to re-anchor the forward ends of said cables, the release of the clutches 55 and 56 permitting the said cables to be unwound readily from said drums. But in order to prevent slacking of the said cables upon interruption of travel of the machine for reasons other than re-anchoring the forward ends of the cables, each drum is equipped with a ratchet wheel 53a and 54a, respectively, normally engaged by pawls 53b and 54b, respectively, which are thrown out when it is desired to unwind cable from the drums for re-anchoring purposes. The toothed clutches 55 and 56 may be omitted.

The foregoing mode of operation of the friction clutches 49 and 50 is rendered possible by the longitudinal slots in the said links 51a and 51b, respectively, as shown. The said link 51b being bent as shown in Figs. 2 and 3 to bring the middle portion thereof below the top of and close to the web of the forward channel-bar of the machine frame to accommodate the bridge-structure shown in Figs. 24 and 25 which is hereinafter fully described.

Below and forward of the axes of said drums 53 and 54 there are fixed shafts 59 and 60 on which sheaves 61 and 62 are rotatable and axially slidable. The cables are trained under these sheaves in order to bring the pull strain into a plane as closely as possible to the crowns of the side forms, said sheaves also serving to cause the cables, when under tension and causing travel of the machine, to wind themselves helically upon the drums.

The friction clutches 49 and 50 are independently operated in order to equalize tension on the cables from time to time and to cause one side of the machine to travel while the other side remains stationary as in rounding curves.

The shaft 44 may be geared directly to the main shaft 14 instead of being geared to the shaft 22 in order that said shaft 44 may rotate at higher speed and thus permit smaller and lighter friction clutches 49 and 50 to be used, it being well known that such clutches operate more efficiently with respect to high-speed than with respect to low-speed shafts. In event of such direct gearing between the shafts 14 and 44, the ratio of speed reduction between the shaft 44 and the cable wind-up drums will, of course, be correspondingly increased. These friction clutches are also advantageous in that they will slip in the event of unusual resistance to travel of the machine due to contact of the shovel blades with boulders, large tree roots and the like, and thus will prevent breakages of machine parts which otherwise might ensue.

The shaft 22 is equipped with a mitre gear wheel 63 which meshes with the similar wheel 64 on one end of the shaft 65 journalled in bearings carried by the parallel plates 66 between which the sprocket chain elevator travels. Said shaft 65 carriers a spur-gear wheel 67 which meshes with the spur-gear wheel 68 on the shaft 69. Idle sprocket wheels 70 over which the elevator chains 71 are trained, are mounted on the shaft 65 said chains 71 being also trained over driven sprocket wheels 72 at the upper outer corner portions of said plates 66 on the shaft 76.

Cross-bar members 73 are disposed between and secured to the side plates 66 between the said sprocket wheel shafts and support a sheet metal apron 74. The said sprocket chains carry the shovel and wiper blades 75 which are rigidly secured to the links of said chains as is clearly shown in Fig. 15, said blades having angularly disposed outer edge portions which overhang the chains 71, the inner edges of said blades brushing the upper surface of the apron 74 during their upward travel.

The sprocket wheel 72 is mounted rigidly on the shaft 76. The sprocket wheels on said shaft over which the elevator sprocket chains are trained, are rigid with said shaft which is driven by the sprocket wheel 85, which is rotatable on the shaft 76. A collar 77 is rigidly mounted on said shaft 76 and is equipped with an arm 78. The sprocket wheel 85 is provided with a projection 79. A bolt 80 passes freely through openings in said projection 79 and said arm 78. A spring 81 is mounted on said bolt 80 and is interposed between the head of the latter and the projection 79 to provide a yielding and shock-absorbing connection between the sprocket wheel 85 and the shaft 76.

The shaft 91, which is driven by means of the bevel gears 63 and 64, is equipped at its rear end with a sprocket wheel 90 which is geared to a sprocket wheel 70' on a stud shaft 69 by means of the sprocket chain 89. The stud shaft 69 is equipped with a spur gear wheel 68 which meshes with the spur gear wheel 67 on the shaft 65 which is also equipped with a sprocket wheel 83. The latter is geared to the said sprocket wheel 85 by means of the sprocket chain 84. The shaft 91 carries the driving sprocket wheels 92 over which the sprocket chains 93, carrying earth conveyor blades 94, are trained. The chains 93 are also trained over pairs of idle sprocket wheels 95 and 96, respectively, carried by shafts 97 and 98, respectively, and under a pair of idle sprocket wheels 99 mounted on the stud-shafts 100, said chains 93 and said blades 94 being disposed between parallel channel-bars 101 of the machine frame.

The blades 94 are preferably provided with serrated outer edges and are secured to brackets 102 carried by links of the chains 93 as shown in Fig. 16.

The shaft 98 is journalled in bearings 103 carried by the plates 104 secured by means of bolts 105 to the said channel-bars 101, the latter being provided with longitudinal slots 106 through which said bolts pass to permit adjustment of the plates 104 to take up slack in said chains 93 (see Fig. 17). The chains 93 and blades 94 are adapted to deliver loose earth into the path of travel of the blades of the elevator chains, the gearing aforesaid and relative arrangement of the respective blades 75 and 94 being such that during a portion of the travel of the latter, their paths are parallel and the blades 94 alternate with the blades 75.

It will be noted that the blades 75 and 94 both travel downwardly and inwardly with respect to the side forms or rails 4 when passing into action with respect to the earth to be removed so that loose earth will remain banked up against the inner opposed faces of said side forms 4. This banking of loose earth out of the paths of the blades 75 and 94 is avoided by disposing plow-blades 107 behind the shovel blades 29, said plow-blades being secured to the forward channel-bar 101 and shaped and arranged to move loose earth inwardly from the side forms so that the same will become disposed in the paths of said blades 75 and 94.

Vertically adjustably mounted on the rear-channel-bar 101 is a series of plates 108 equipped with rearwardly extending lower edge flanges 109 which are relatively arranged so that their lower faces are disposed in exactly the plane of the proposed fine-grade.

The flanges 109 of said plates 108 constitute smoothing and compacting elements to cooperate with the shovel blades and conveying means to work loose earth down into the fine-grade, thus to compact the latter and constitutes the final factor in the provision of an accurate fine-grade. These plates also function to relieve the side forms of a part of the weight of the machine, this being very desirable and important when working in marshy or other soft-earth districts.

One of the purposes of the eccentrics 6 is to adjust the elevation of the machine frame to permit the same to ride upon side forms 4 of different heights, as from eight to ten inches. This could be accomplished by elevating or lowering the shovel blades only, but such adjustment of the latter would, obviously change their angle of disposition and would, furthermore, too greatly vary the pressure exerted by the springs 41ª to render it practicable.

Suitable guides 110 are secured to the inner faces of the channel-bars 101 to cause the lower edges of the blades 94 to travel in the desired plane of the fine-grade, said guides supporting the sprocket chains 93 (see Fig. 14).

In Fig. 26, I have shown one of the earth deflecting plates 107, the forward end portion of which is curved and extends inwardly from the inner face of the side form sufficiently far to bring loose earth disposed adjacent the latter into the path of the conveyor plates at one side of the pavement strip and into the path of the elevator plates at the other side of said strip.

*Operation*

After having anchored the free ends of the cables 57 and reengaged the toothed clutches 56 and 55, the engine 11 is started.

The eccentrics 6 will have been previously adjusted to determine the plane of the first cut made by the shovels 29 which, in many instances, will be appreciably higher than the ultimate fine-grade plane.

At the time of starting the engine, the clutches 15, 49 and 50 will be disengaged and after the engine is running, the clutch 15 will be first thrown in to cause the shafts 14, 22 and 44 to rotate. This will cause the shovels 29 and the conveyor and elevator mechanisms to operate.

The clutches 49 and 50 are then thrown in and manipulated to take up the slack in both cables equally and, when this has been accomplished, the forward travel of the machine begins. The speed of travel of the machine is about seven feet per minute in ordinary soils as distinguished from very hard soils and assuming that the soil between the side forms has not previously been prepared as hereinafter described.

In the instant case there are nine of the shovel blades 29, this number being, of course, subject to change. Assuming the distance between the opposed inner faces of the side forms to be twenty feet, each of the shovel blades 29 will be of a width substantially one-ninth of twenty feet, allowance being made for a very slight spacing of the shovel blades from each other. The arrangement is such that the two shovel blades nearest the respective side forms constitute a pair operating in unison; the next inner shovel blades form another pair, and so on, the eccentrics 25 associated with each of the respective pairs of said shovel blades are axially offset from those associated with other pairs so that the respective pairs of shovel blades will make successive cuts thereby to lessen the engine load and the stresses on the machine frame and operating elements. The stroke of each shovel blade is such that its successive cuts will be of a length approximately two thirds of an inch. Thus the speed of travel of the machine being eighty four inches for each one hundred twenty five revolutions of the shaft 22, it obviously follows that each cutting stroke of a shovel blade will be eighty four one hundred twenty fifths of an inch. Owing to the substantially rotary movement of the cutting edges of the shovel blades, each cutting stroke terminates in a lifting stroke which serves to break up the earth thoroughly and will cause the same to first bank up on the shovel blades to a height of about six inches and then further earth will pass over the rear edges of said blades.

The speed of travel of the conveyor blades 94 and the elevator blades 75 and the width of said respective blades is such that each of the blades 94 will be required to move only a relatively small amount of earth into the path of the blades 75, the latter being appreciably wider than the blades 94 in order to better assure that they will take up all of the earth fed thereto by the blades 94 because of the tendency of the loose earth to spread.

The serrated earth engaging edge portions of the blades 94 serves to leave some of the more finely divided earth on the fine-grade cut by the shovel blades and this is pressed down by the flanges 109 of the smoothing plates 108 to provide a very smooth and well-compacted fine-grade. This fine earth is subjected to the weight of the rear end portion of the machine so that it will be forced down unless the soil is of a very hard nature.

The delivery end of the elevator mechanism discharges the earth beyond one of the side forms and, in instances where narrow gauge railway equipment is used for the transportation of the paving material ingredients, provides a high bank upon which the railway is laid.

Obviously, in many instances, the shovel blades will pass over depressions or hollows extending below the plane of cut and these will accordingly, be filled at least in part by the earth banked upon said blades and in part by earth carried into the same by the blades 94. Some manual shoveling operation is usually required to completely fill such hollows as by shoveling loose earth banked upon the shovel blades into the said hollows before said shovel blades pass over the same, this being done by the men in charge of the machine, usually two in number, who have ample time to do this work and also pat down the fill so that by the time the machine has passed such hollows the earth in the areas thereof will be quite as firm as the remaining area.

In paved highway construction it is customary first to "rough-grade" the area to be paved by means of plows and harrows. Where the fine-grading is intended to be manually effected, it is customary to include in the rough-grading operation that of removing all earth in excess of about two inches average depth above the proposed ultimate fine-grade, this removal being effected economically by wheeled scrapers before the side forms are laid in order to minimize the hand labor incident to removing this surplusage after the side forms are laid.

It is quite obvious that road construction contractors are desirous of saving all costs possible in such construction and realizing that a machine such as is hereinbefore shown and described, can remove such surplus earth more cheaply than is possible with horse or tractor drawn wheeled scrapers, will prefer to use said machine for this purpose wherever possible and thus will subject it to strains and stresses far beyond those which it is intended to withstand consistently with light weight and low cost. This is particularly true with respect to instances where users of the machine eliminate the customary rough-grading operations and thus not only force the shovel blades to cut through very compact earth, but also to encounter stones and boulders. The stones of small size are easily dislodged by the shovel blades but are likely to clog or injure the conveyor and elevator mechanisms, while boulders must necessarily cause break-downs unless the clutches 49 and 50 are promptly thrown out to interrupt travel of the machine. Generally, it then becomes necessary to throw out the pawls and the toothed clutches also, if provided, to slacken the cables and then slightly back up the machine in order to permit the boulder to be removed manually.

The shock absorbing springs associated with the shovel blades and the slippage of the friction clutches 49 and 50 are the only safeguards against breakages upon encountering boulders and, for reasons of economy in the avoidance of break-downs and for the production of very uniformly compact fine-grades, I have found the practice of the following method to be most economical and efficient.

This method consists in first rough-grading the area to be paved by plowing and harrowing the same to a depth approximately two or more inches below the proposed ultimate fine-grade plane and removing all stones and boulders without, however, removing surplus earth, and then running heavy rollers over the plowed and harrowed area to compact the same substantially uniformly throughout, then laying the side forms and thereafter passing the above machine over this area as many times as may be reasonably necessary to remove the surplus earth down to the ultimate fine-grade plane.

This method includes the further steps of cutting down the earth to a plane slightly below and parallel with the ultimate fine-grade plane, the added depth of cut being from one-eighth to three-eighths of an inch and, as a further step, leaving slightly more than this additional slice of earth on the fine-grade surface thus produced, as by having the lower edges of the conveyor blades operate in a plane from one-eighth to three-eighths of an inch above the ultimate fine-grade plane, and thereafter smoothing and compacting this surplusage to compact the earth further and to reduce it to the exact ultimate fine-grade plane.

While the operations defined in the next preceding paragraph may obviously be performed by hand with the use of ordinary tools such as picks, shovels, road-scrapers and rollers or their equivalents, they are more easily and cheaply performed by the machine of this invention by so adjusting the plates 108 so that the flanges 109 thereof will have their lower faces disposed the exact distance below the crowns of the side forms co-inciding with that of the ultimate fine-grade, and adjusting the shovel blades so that their cutting edges will operate in a plane one-eighth to three-eighths of an inch below the ultimate fine-grade plane, and so disposing the blades 94 of the conveyor as to cause the same to leave upon the fine-grade cut by the shovel blades a depth of surplus earth required not only to restore the said one-eighth to three-eighths of an inch cut away by said shovel blades, but enough in addition thereto to cause the flanges 109 to increase the compaction previously effected by the rolling operation which follows the rough-grading.

The resulting fine-grade is thus rendered accurate and as nearly uniformly dense or compact as is humanly possible of attainment with reasonable or commercial economy, the additional cost of so rough-grading and rolling the area being easily compensated by economy of the machine operation consequent thereto and the avoidance of break-downs, repairs and loss of time incident thereto.

In the instance illustrated, the members 107 consist of flat curved plates having shanks pivoted between their ends by means of bolts 107ª to the rear channel-bar 101 and engaged at their upper ends by springs 107ᵇ (see Figs. 1 and 14) to hold the front edge portions thereof in close contact with the inner faces of the side forms.

Attention is directed to the fact that the conveyor plates and the elevator plates must travel at equal speed and in this connection attention is also directed to the fact that in Fig. 18 the sprocket wheels 70' and 83 should be interchanged in order that the equal speed of said plates may be had. In other words, the sprocket wheel 83 should be shown as mounted on the shaft 69 and the sprocket wheel 70' should be shown as mounted on shaft 65 and the ordinals thereof remain as now shown.

During travel of the machine, the amount of earth passing over the shovel blades for removal by the conveyor and elevator blades will frequently be of such large volume that the latter cannot readily remove the same and, in such instances, it becomes desirable to throw out both clutches 49 and 50 simultaneously and intermittently to cause the machine to travel similarly and thus cause the elevator and conveyor mechanisms to remove the larger volume of earth which would necessarily accumulate when cutting away a depth of earth well in excess of two inches above the ultimate fine-grade plane.

In the ordinary course of travel of the machine, it is quite usual for various reasons, that one side thereof will travel a bit faster than the other and that, therefore, one of the clutches 49 or 50 must be thrown out or relieved sufficiently to cause slippage in order that the retarded side of the machine will be caused to advance to proper position with respect to the advanced side. Such operation is also required when the machine is rounding curves.

Modifications

In highway construction the speed of completion of the pavement, expressed in terms of lineal feet over the area bordered by the side forms is dependent mainly upon the speed at which the paving material is deposited upon the fine-grade. That material is usually deposited at depots or stations at spaced points along the proposed highway as, for example, at intervals of one mile, the first thereof being approximately that far ahead of the point at which the pavement begins. In many instances the composites of the ultimate material are found at said stations and are carried to the mixer which produces the plastic pavement and deposits the same. In other instances the mixing is effected at the station and the plastic material then delivered to the place of deposit.

In either event, the transportation from the station is effected either by narrow gauge railway equipment disposed along one side of the area to be paved or by means of trucks which travel over the area to be paved and, consequently, over at least a part of the fine-grade in advance of the point of deposit of the plastic material. The last-mentioned method is becoming gradually more popular because the contractor can sub-let the hauling part of the work to truck owners and thus be relieved of the large investment incident to owning the narrow gauge railway equipment, and this again renders very necessary that the fine-grading machine shall be so light as to be capable of being turned readily through an arc of ninety degrees to permit the trucks to pass, unless the contractor possesses sufficient lengths of side forms to permit all of the fine-grading necessary for a day's paving operation to be effected in advance.

As the pavement laid per day is sometimes in excess of seventeen hundred lineal feet though not generally over one thousand feet, of a twenty to twenty-four ft. wide strip, and the side forms bordering the finished paving cannot be removed until the latter has set, it obviously requires that the contractor have not less than about seven thousand feet of said side forms available for use.

Economy of investment in equipment, therefore, dictates the policy of completing the fine-grade only a short space ahead of the area of deposit of paving material. Interruption of fine-grading operations and turning of the fine-grading machine for the passage of the trucks is laborious and, therefore, the provision of a means for permitting passage of trucks otherwise than by so turning the fine-grading machine is very desirable.

The instant machine is particularly designed to reduce height above the crowns of the side forms and ultimate fine-grade plane to a minimum which, in this instance, is less than two feet above the ultimate fine-grade plane along that part of the frame lying between the levers 51 and 52 and rearwardly thereof.

This moderate height of the frame permits the use of a bridge structure, such as is illustrated in Figs. 24 and 25, which comprises, for example, two sets 116 of parallel channel-bars or the like bolted together and spaced from each other a distance equal to that between the wheels on opposite sides of trucks intended to pass over said structure. This bridge structure includes the usual flat middle portion and oppositely inclined end portions, said middle portion being of a length slightly greater than the distance between the front edge of the front frame channel-bar and the rear edge of the rear frame channel-bar 101, the inclined end portions being adapted to be supported upon the pavement strip by means of the shoes 116ª secured thereto.

Said bridge structure 116 is normally supported upon the machine frame in an elevated position to cause the shoes 116ª to be disposed sufficiently above the pavement strip to avoid interference with travel of the machine, such support being effected by means of the springs 116ᵇ bearing on plungers 116ᶜ which rest upon the front frame channel and the rear frame channel 101, said springs and plungers extending into the cylindrical housings 116ᵈ at the ends and outer sides of the middle portions of the bridge structure. The angle iron frame members 116ᵉ of said bridge structure limit the longitudinal movement of the latter relatively to the machine frame, said bridge structure being readily removable.

In use, the travel of the machine is interrupted to permit a truck to pass over the bridge structure, the cables preventing the machine from yielding to the impact incident to loaded trucks striking and depressing the forward end of the bridge structure and passing over the latter. The reverse passage of empty trucks will not, it is believed, impart sufficient impact to affect the position of the machine for the reason that the rear supporting shoes of the bridge structure may be normally positioned so slightly above the finished fine-grade as to lower them to contact therewith before such impact is felt by the machine frame.

Obviously, the travel of trucks over the finished fine-grade will produce ruts in the latter and these must be eliminated by hand labor as is commonly practised in manually produced fine-grades at this time.

The machine herein shown and described is built to span paving strips up to a maximum width of twenty-eight feet. In instances where the paving strip is from thirty-six to forty feet wide, a twenty-foot machine is preferably used and is operated to fine-grade one side of the pavement strip, and after said strip is paved, is then used to fine-grade the other side of said strip. This method of operation is advantageous in that the trucks will travel first over the rough-grade at one side of the pavement strip and, while the machine is fine-grading the other side thereof, will travel upon the pavement aforesaid.

During the first-mentioned fine-grading operation, the machine may, of course, be caused to travel on a side form and on a mid-form laid temporarily between the side forms but the laying of these additional forms is expensive and is subject to the objection relative to the added investment aforementioned.

Hence, in Fig. 23, I have shown the inner end of the machine frame connected with one leg of an overhead bridge structure 111, the other leg of which rides upon the side form disposed opposite said end of said machine, said bridge structure spanning the space between the inner end of the machine and said last-named side form. The wheels 3 are transferred from the inner end of the machine frame to the leg of the bridge structure which rides upon the other side form and, in this structure, one of the cables is trained over idle sheaves 113, 114, and 115, carried by said bridge structure.

Figure 28:
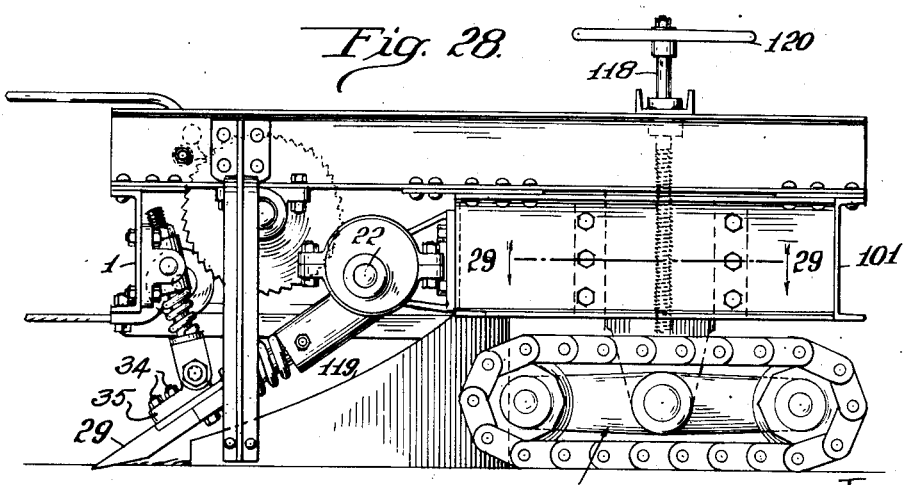
Fig. 28 is a side elevation of the inner end of the machine shown in Fig. 27.
Figure 29:
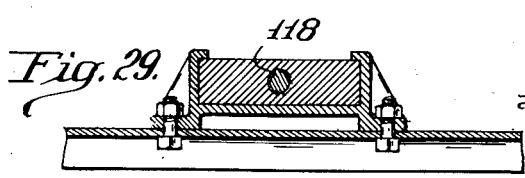
Fig. 29 is a fragmentary detail plan sectional view on the line 29—29 of Fig. 28.

In Figs. 27 and 28, I have illustrated a further modification and what may be termed an attachment to the machine to adapt the latter to fine-grade one side portion of a paving strip without requiring the laying of a supporting rail between the side forms of the latter.

In this structure the shaft 22 is extended through the end frame channel-bar at the end of the machine opposite the elevator mechanism and is equipped at its projecting end with an eccentric corresponding with that nearest the inner face of said channel-bar on said shaft. A wider shovel blade is associated with these eccentrics to cut a fine-grade slightly exceeding the width of the machine, this end portion of the latter being supported upon a caterpillar tractor unit or truck 117 which is preferably idle.

The wheels 3 at the other side of the machine frame are, in this instance, provided with flanges along both edges to better retain them on the side form. The cable for the inner end portion of the machine is anchored at its forward end to a stake driven into the paving strip midway between the side forms, and the machine operated in the usual way with respect to the clutches 49 and 50.

A screw-shaft or jack-screw 118 is suitably mounted upon the inner end portion of the machine frame and engaged with the caterpillar tractor truck to raise or lower said frame with respect to said truck, the latter being confined against lateral and longitudinal movement relatively to the machine frame by means of suitable guide structures.

In travel, the last-mentioned shovel blade cuts the path in which the tractor travels and a deflecting blade 119 between the latter and said shovel blade moves the loose earth into the path of travel of the conveyor blades.

A spirit level on the machine frame may be provided to afford a guide for the operator of the hand-wheel 120 of the jack-screw to raise and lower the machine relatively to the truck to compensate for any sinking of the latter into the fine-grade as in passing over recently filled hollows or depressions.

Obviously, the caterpillar truck shown in Figs. 27 and 28 may also be used in connection with the bridge structure of Fig. 23.

The word "plane" included within the phrase "fine-grade plane" as used herein, has reference to the ultimate desired contour or face of the grade upon which the paving material is to be deposited.

I claim as my invention:

1. A fine-grading machine comprising a carriage for travel along a pavement strip, power actuated mechanism for propelling said carriage, a power actuated shaft thereon, a plurality of reciprocable earth-cutting blades, means on said shaft for actuating said blades, and rocking suspension members connected with said blades inwardly of the cutting edges of the same and cooperating with said actuating means on said shaft to impart to the cutting edges of said blades a substantially rotary movement.

2. A fine-grading machine comprising a carriage for travel along a pavement strip, power actuated mechanism for propelling said carriage, a power actuated shaft thereon, a plurality of reciprocable earth-cutting blades, means on said shaft for actuating said blades, and rocking suspension members connected with said blades and cooperating with said actuating means on said shaft to impart to the cutting edges of said blades a substantially rotary movement whereby the cutting stroke thereof is followed by an upward earth breaking movement, a retractive movement and a downward movement.

3. A fine-grading machine comprising a carriage for travel along a pavement strip, power actuated mechanism for propelling said carriage, a power actuated shaft thereon, a plurality of reciprocable earth-cutting blades, means on said shaft for actuating said blades, and rocking suspension members connected with said blades and cooperating with said actuating means on said shaft to impart to said blades a substantially rotary movement, and shock-absorbing springs interposed between said blades and said actuating means.

4. A fine-grading machine comprising a carriage for travel along a pavement strip, power actuated mechanism for propelling said carriage, a power actuated shaft thereon, a plurality of reciprocable earth-cutting blades, means on said shaft for actuating said blades, and rocking suspension members connected with said blades and cooperating with said actuating means on said shaft to impart to said blades a substantially rotary movement, and shock-absorbing springs operatively associated with said blades and said suspension members.

5. A fine-grading machine comprising a carriage for travel along a pavement strip, power actuated mechanism for propelling said carriage, a power actuated shaft thereon, a plurality of reciprocable earth-cutting blades, means on said shaft for actuating said blades, and rocking suspension members connected with said blades and cooperating with said actuating means on said shaft to impart to said blades a substantially rotary movement, shock-absorbing springs interposed between said blades and said actuating means, and shock-absorbing springs operatively associated with said blades and said suspension members.

6. A fine grading machine comprising a carriage for travel along a pavement strip, power actuated mechanism for propelling said carriage, a plurality of earth-cutting blades, power actuated mechanism for reciprocating said blades longitudinally of the travel of the carriage, and suspension links connecting said blades with the machine frame at points spaced from the last-named mechanisms for cooperation with the latter to cause the cutting edges of said blades to rotate about a substantially horizontal axis during reciprocation of said blades.

7. A fine grading machine comprising a carriage for travel along a pavement strip, power actuated mechanism for propelling said carriage, a plurality of earth cutting blades, power actuated mechanism for reciprocating said blades longitudinally of the travel of said carriage, suspension links connecting the said blades between their ends and adjacent their cutting edges with the carriage for cooperation with said last-named mechanism to cause the cutting edges of said blades to rotate about a substantially horizontal axis, and shock absorbing means associated with said blades during reciprocation thereof.

8. A fine grading machine comprising a carriage for travel along a pavement strip, power actuated mechanism for propelling said carriage, a plurality of earth cutting blades, power actuated mechanism for reciprocating said blades longitudinally of the pavement strip, suspension links connected with said blades rearwardly of and contiguous to the cutting edges of the same for cooperation with the last-named mechanism to cause the cutting edges of said blades to rotate about a substantially horizontal axis during reciprocation of said blades, and shock absorbing means associated with said blades, said means, and said mechanism, respectively, for causing variation of the normal movement of said blades upon encountering obstructions.

9. A fine-grading machine comprising a carriage adapted to travel on the side forms bordering a pavement strip, power actuated mechanism for effecting travel of said carriage, a plurality of earth cutting blades, power actuated mechanism for causing the cutting edges of said blades to move downwardly and forwardly and then upwardly and rearwardly to cut and break an earth layer to be removed, power actuated means for projecting loose earth over and to the rear of said cutting blades, earth conveying and elevating mechanism disposed rearwardly of said cutting blades and arranged to remove all except a thin layer of said earth out of the pavement strip, and means disposed rearwardly of and closely adjacent to said conveying mechanism for compacting and smoothing said thin layer of loose earth, said earth conveying mechanism arranged to prevent accumulation of surplus loose earth in front of the smoothing and compacting means.

10. A fine-grading machine adapted to travel on the side forms bordering a pavement strip, power actuated mechanism for effecting travel of said carriage, a plurality of earth-cutting blades, power actuated mechanism for actuating said blades during travel of the carriage, earth conveying and elevating mechanism disposed rearwardly of and spaced from said blades and including downwardly extending traveling plates having their lower edge portions arranged to move loose earth laterally of said pavement strip, and earth compacting and smoothing means disposed rearwardly of said conveying mechanism and presenting a lower edge portion disposed in the fine-grade plane.

11. A fine-grading machine adapted to travel on the side forms bordering a pavement strip, power actuated mechanism for effecting travel of said carriage, a plurality of earth-cutting blades, power actuated mechanism for actuating said blades during travel of the carriage, earth conveying and elevating mechanism disposed rearwardly of and spaced from said blades and including downwardly extending traveling plates having their lower edge portions arranged to move loose earth laterally of said pavement strip, guide means associated with said conveying mechanism for causing the lower edge portion of said plates to travel in a plane parallel with the ultimate fine-grade plane, and earth compacting and smoothing means disposed rearwardly of said conveying mechanism and presenting a lower edge portion disposed in the fine-grade plane.

12. A fine-grading machine adapted to travel on the side forms bordering a pavement strip, power actuated mechanism for effecting travel of said carriage, a plurality of earth-cutting blades, power actuated mechanism for actuating said blades during travel of the carriage, earth conveying and elevating mechanism disposed rearwardly of and spaced from said blades and including downwardly extending traveling plates having their lower edge portions arranged to move loose earth laterally of said pavement strip, guide means associated with said conveying mechanism for causing the lower edge portion of said plates to travel in a plane parallel with and spaced upwardly from the ultimate fine-grade plane, and earth compacting and smoothing means disposed rearwardly of said conveying mechanism and presenting a lower edge portion disposed in the fine-grade plane.

13. A fine-grading machine comprising a carriage arranged for travel on the side forms bordering a pavement strip, an engine on said carriage, a main shaft geared to the shaft of the engine, a clutch controlling the connection of said shafts with each other, a countershaft parallel with said main shaft and geared thereto, a series of eccentrics on said countershaft, a series of earth cutting blades operatively connected with said eccentrics for reciprocation thereby, rocking suspension devices connected with said blades for support thereof, adjusting means on said suspension devices for varying the elevation of said blades with respect to the carriage, manually operable means for adjusting the elevation of the carriage relatively to the side forms, earth conveying means traveling laterally of the side forms and permanently geared to said countershaft for rotation in unison therewith, said respective adjusting means cooperating to vary the relative paths of action of said cutting blades and conveying means with respect to said pavement strip.

14. In a fine-grading machine, a carriage, a plurality of reciprocable earth-cutting blades, a rocking suspension member for each of said blades, means on each rocking member for adjusting the elevation of the blades with respect to said carriage, an engine on the carriage operatively connected with said blades for reciprocating the same, and propelling means for said carriage operatively connected with said engine for actuation thereby.

15. In a fine-grading machine, a carriage adapted to travel on the side forms of a pavement strip, cutting blades disposed at the front of said carriage for cutting the earth level in said strip to a predetermined lower level, an earth removing means comprising conveying and elevating mechanisms, each including sprocket wheels and chains, the latter equipped with earth engaging plates, said conveyor disposed between and traveling laterally of said side forms and having the path of travel of said blades include an arc substantially tangential of the inner face of a side form and downwardly relatively thereto and then parallel with the level cut by said blades, the free edges of said blades brushing loose earth into the path of said elevator plates, the path of travel of said elevator plates being in part on a downwardly inclined plane closely proximate to the upper inner corner of the other side form, said elevator and conveyor plates traveling in respectively opposite directions with their paths of travel intersecting and overlapping each other, and gearing between said respective mechanisms to cause the plates of one thereof to alternate with those of the other within the zone of overlap of said paths of travel.

16. A fine-grading machine including a carriage adapted for travel on the side forms of a pavement strip and equipped with earth-cutting blades adapted to cut earth in said strip to a predetermined lower level, means disposed behind said blades for moving loose earth inwardly from said side forms, and earth conveying and elevating mechanisms arranged to carry loose earth so moved inwardly and otherwise disposed between said side forms, laterally beyond one of the latter, said mechanisms having partially overlapping paths of travel, and shock-absorbing means associated with one of said mechanisms for permitting the same to yield to stresses resulting from stones and the like encountered thereby.

17. A fine-grading machine including a carriage adapted for travel on the side forms of a pavement strip and equipped with earth-cutting blades adapted to cut earth in said strip to a predetermined lower level, earth deflecting plates disposed behind said blades, springs engaging said plates for maintaining the same in yielding contact at their forward ends with the inner faces of the side forms for causing said plates to move loose earth inwardly from the latter, and earth conveying and elevating mechanisms arranged to carry loose earth so moved inwardly and otherwise disposed between said side forms, laterally beyond one of the latter.

18. A fine-grading machine including a carriage adapted to travel on the side forms bordering a pavement strip, a plurality of cutting blades disposed at the front of said carriage, earth conveying and elevating mechanisms disposed behind said blades, an engine on the carriage, cable wind up drums at the sides and forward end of said carriage, a main shaft geared to the engine shaft, a clutch interposed between said shafts, two countershafts geared to said main shaft, one of the latter being operatively connected with said blades for imparting motion thereto relatively to the carriage during travel of the latter, the other of said shafts being axially aligned with said drums, a pair of shafts between the said drums and said last-named countershaft and aligned axially therewith, clutches associating said pair of shafts with said respective drums, planetary speed reducing gears actuating said pair of shafts, friction clutches for associating said reducing gears with said last-named countershaft, and mitre gearing connecting the first-named countershaft with said conveying and elevating mechanisms for actuating the latter.

19. A power actuated fine-grading machine including a power propelled carriage spanning the pavement strip and arranged for travel on side forms bordering said strip, earth cutting and conveying mechanism on said carriage and a bridge-structure extending over said carriage from front to rear thereof and loosely engaged therewith for propulsion thereby, said bridge structure being adapted for travel of vehicles over said carriage.

20. A power actuated fine grading machine including a power propelled carriage spanning the pavement strip and arranged for travel on side forms bordering said strip, earth cutting and conveying mechanism on said carriage and a bridge structure extending over said carriage from front to rear thereof and loosely engaged therewith for propulsion thereby and springs arranged to support said bridge yieldingly upon said carriage and normally at an elevation to cause said bridge to pass freely over the surface of the pavement strip during travel of the carriage, said bridge being adapted to be depressed for support upon the pavement strip by trucks passing over the said bridge.

21. A machine of the kind specified comprising a power propelled carriage, a series of earth cutting blades at the forward end of the carriage, a series of power actuated devices for reciprocating said blades to impart thereto a forward and back motion, a series of suspension links connecting said blades with the carriage for cooperation with said devices for imparting a limited up and down movement to said blades during their reciprocation, mechanism for projecting loose earth over said blades, a conveyor mechanism disposed behind said blades and spaced therefrom and including scraper blades traveling laterally of said cutting blades for carrying loose earth to one side of the path of operation of the cutting blades.

22. A machine of the kind specified comprising a carriage adapted to travel on side forms bordering a pavement strip and including three parallel frame members spanning the pavement strip, bearings disposed upon the middle one of said members, a shaft journalled in bearings on said member, a series of eccentrics carried by said shaft, a series of earth cutting blades arranged to be reciprocated by said eccentrics and having their forward end portions disposed below the forward frame member, a series of suspension links connecting the forward frame member with the forward end portions of said blades, mechanism for carrying loose earth from said pavement strip, mechanism for propelling the carriage, and an engine on said frame for actuating said propelling mechanism, said earth carrying mechanism and said shaft.

23. A machine of the kind specified comprising a carriage adapted to travel on side forms bordering a pavement strip and including three parallel frame members spanning the pavement strip, bearings disposed upon the middle one of said members, a shaft journalled in bearings on said member, a series of eccentrics carried by said shaft, a series of earth cutting blades arranged to be reciprocated by said eccentrics and having their forward end portions disposed below the forward frame member, a series of suspension links connecting the forward frame member with the forward end portions of said blades, mechanism disposed between the rear and middle frame members for carrying loose earth from said pavement strip, mechanism for propelling the carriage, and an engine on said frame for actuating said propelling mechanism, said earth carrying mechanism and said shaft.

24. A machine of the kind specified comprising a carriage adapted to travel on side forms bordering a pavement strip and including three parallel frame members spanning the pavement strip, bearings disposed upon the middle one of said members, a shaft journalled in bearings on said member, a series of eccentrics carried by said shaft, a series of earth cutting blades arranged to be reciprocated by said eccentrics and having their forward end portions disposed below the forward frame member, a series of suspension links connecting the forward frame member with the forward end portions of said blades, mechanism for carrying loose earth from said pavement strip, mechanism for propelling the carriage, and an engine on said frame for actuating said propelling mechanism, said earth carrying mechanism and said shaft, and manually operable means for selectively disassociating several of said mechanisms from the engine.

25. A machine of the kind specified comprising a carriage adapted to travel on side forms bordering a pavement strip and including three parallel frame members spanning the pavement strip, bearings disposed upon the middle one of said members, a shaft journalled in bearings on said member, a series of eccentrics carried by said shaft, a series of earth cutting blades arranged to be reciprocated by said eccentrics and having their forward end portions disposed below the forward frame member, a series of suspension links connecting the forward frame member with the forward end portions of said blades, mechanism for projecting loose earth over said blades, mechanism for carrying loose earth from said pavement strip, mechanism for propelling the carriage, and an engine on said frame for actuating said propelling mechanism, said earth carrying mechanism and said shaft.

26. A machine of the kind specified comprising a carriage adapted to travel on side forms bordering a pavement strip and including three parallel frame members spanning the pavement strip, bearings disposed upon the middle one of said members, a shaft journalled in bearings on said member, a series of eccentrics carried by said shaft, a series of earth cutting blades arranged to be reciprocated by said eccentrics and having their forward end portions disposed below the forward frame member, a series of suspension links connecting the forward frame member with the forward end portions of said blades, mechanism for projecting loose earth over said blades, and manually operable means for selectively disassociating several of said mechanisms from the engine.

27. A machine of the kind specified comprising a carriage adapted to travel on side forms bordering a pavement strip and including three parallel frame members spanning the pavement strip, bearings disposed upon the middle one of said members, a shaft journalled in bearings on said member, a series of eccentrics carried by said shaft, a series of earth cutting blades arranged to be reciprocated by said eccentrics and having their forward end portions disposed below the forward frame member, a series of adjustable suspension links connecting the forward frame member with the forward end portions of said blades for varying the depth of the cutting zone of the said cutting blades, mechanism for carrying loose earth from said pavement strip, mechanism for propelling the carriage, and an engine on said frame for actuating said propelling mechanism, said earth carrying mechanism and said shaft.

28. A machine of the kind specified comprising a carriage adapted to travel on side forms bordering a pavement strip and including three parallel frame members spanning the pavement strip, bearings disposed upon the middle one of said members, a shaft journalled in bearings on said member, a series of eccentrics carried by said shaft, a series of earth cutting blades arranged to be reciprocated by said eccentrics and having their forward end portions disposed below the forward frame member, a series of adjustable suspension links connecting the forward frame member with the forward end portions of said blades for varying the depth of the cutting zone of the said cutting blades, mechanism disposed rearwardly of the cutting blades for discharging loose earth beyond a side edge of the pavement strip, means disposed in advance of the said conveying mechanism for moving loose earth inwardly from the side forms into the path of said mechanism, mechanism for propelling the carriage, and an engine on said frame for actuating said propelling mechanism, said earth carrying mechanism and said shaft.

29. A machine of the kind specified comprising a power propelled carriage adapted to travel upon the side forms bordering a pavement strip, mechanism at the front of said carriage for loosening earth to a predetermined depth between the said side forms, earth conveying mechanism for removing loose earth to a predetermined level from between said side forms, said conveying mechanism being disposed behind and spaced from said first-named mechanism, means disposed between the said mechanisms and in engagement with the side forms for moving loose earth inwardly from the latter and into the path of said conveying mechanism, and an engine on the carriage for propelling the same and actuating the said mechanisms.

30. A machine of the kind specified comprising a power propelled carriage adapted to travel upon the side forms bordering a pavement strip, mechanism at the front of said carriage for loosening earth to a predetermined depth between the said side forms, earth conveying mechanism for removing loose earth to a predetermined level from between said side forms, said conveying mechanism being disposed behind and spaced from said first-named mechanism, means disposed rearwardly of the first-named mechanism and in engaging relation to the said side forms for moving loose earth inwardly from the latter and into the path of said conveying mechanism, and an engine on the carriage for propelling the same and actuating the said mechanisms.

31. A machine of the kind specified comprising a power propelled carriage adapted to travel upon the side forms bordering a pavement strip, mechanism at the front of said carriage for loosening earth to a predetermined depth between the said side forms, earth conveying mechanism for removing loose earth to a predetermined level from between said side forms, said conveying mechanism being disposed behind and spaced from said first-named mechanism, devices disposed rearwardly of the first-named mechanism and in engaging relation to the said side forms for moving loose earth inwardly from the latter into the path of said conveying mechanism, springs arranged to maintain said devices in engagement with the said side forms, and an engine on the carriage for propelling the same and actuating the said mechanisms.

32. A machine of the kind specified comprising a power propelled carriage adapted to travel upon the side forms bordering a pavement strip, mechanism at the front of said carriage for loosening earth to a predetermined depth between the said side forms, earth conveying mechanism behind said first-named mechanism and spaced therefrom for moving loose earth to a predetermined level laterally of the said side forms in one direction, earth elevating and discharging mechanism disposed at one side of the carriage and fed by said conveying mechanism, devices cooperating with said conveying mechanism for moving loose earth inwardly from the said side forms into the path of said conveying mechanism, and an engine on the carriage for propelling the same and actuating the said mechanisms.

33. In a fine grading machine adapted to travel upon side forms bordering a pavement strip, the combination with mechanism for breaking up an earth layer overlying a predetermined plane between said side forms, of earth scraping and conveying mechanism disposed behind said earth breaking mechanism and operating to remove loose earth down to a predetermined level substantially coincident with the said plane, and means disposed between said respective mechanisms for moving loose earth normally disposed out of the path of said conveying mechanism into the path thereof.

34. In a fine grading machine adapted to travel upon side forms bordering a pavement strip, the combination with mechanism for breaking up an earth layer overlying a predetermined plane between said side forms, of earth scraping and conveying mechanism disposed behind said earth breaking mechanism and operating to move loose earth laterally over a side form of said strip over the entire width of the zone of action of said earth breaking mechanism and down to a level substantially coincident with the said predetermined fine grade plane, and means disposed between said respective mechanisms for moving loose earth normally disposed out of the path of said conveying mechanism into the path thereof.

ROBERT D. BAKER.